(12) United States Patent
Wendzel et al.

(10) Patent No.: US 11,397,191 B2
(45) Date of Patent: Jul. 26, 2022

(54) GRADIENT DETERMINATION FOR MEASURING ROTATIONAL SPEEDS

(71) Applicant: ZF Friedrichshafen AG, Friedrichshafen (DE)

(72) Inventors: Andreas Wendzel, Grünkraut (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 84 days.

(21) Appl. No.: 16/769,537

(22) PCT Filed: Nov. 7, 2018

(86) PCT No.: PCT/EP2018/080423
§ 371 (c)(1),
(2) Date: Jun. 3, 2020

(87) PCT Pub. No.: WO2019/110228
PCT Pub. Date: Jun. 13, 2019

(65) Prior Publication Data
US 2021/0382083 A1  Dec. 9, 2021

(30) Foreign Application Priority Data
Dec. 5, 2017  (DE) .................. 10 2017 221 876.2

(51) Int. Cl.
*G01P 3/44*  (2006.01)
*G01P 3/36*  (2006.01)

(52) U.S. Cl.
CPC . *G01P 3/44* (2013.01); *G01P 3/36* (2013.01)

(58) Field of Classification Search
CPC ..................................... G01P 3/44; G01P 3/36
See application file for complete search history.

(56) References Cited

U.S. PATENT DOCUMENTS

| 4,315,213 A | 2/1982 | Wolff |
| 4,635,201 A * | 1/1987 | Izumi .................. F02D 41/0097 |
| | | 123/480 |

(Continued)

FOREIGN PATENT DOCUMENTS

| DE | 29 18 802 A1 | 11/1980 |
| DE | 34 01 751 A1 | 7/1984 |

(Continued)

OTHER PUBLICATIONS

Search Report issued in German Patent Application No. DE 10 2017 221 876.2 dated Dec. 5, 2017(10 pages).

(Continued)

*Primary Examiner* — Manuel A Rivera Vargas
(74) *Attorney, Agent, or Firm* — Crowell & Moring LLP

(57) ABSTRACT

An assembly has a rotating element, a sensor, and an evaluation unit; wherein the element has a number a of markings; wherein the markings pass through a region detected by the sensor in cycles when the element rotates; wherein the sensor is configured to send a signal to the evaluation unit; and wherein the evaluation unit is configured to assign a time $t_i$ for when each signal is sent, wherein the evaluation unit is configured to calculate a function m(t) over time t as a measure for a gradient of the rotational rate of the element.

4 Claims, 5 Drawing Sheets

(56) References Cited

U.S. PATENT DOCUMENTS

| | | |
|---|---|---|
| 5,916,295 A | 6/1999 | Colvin |
| 6,130,928 A | 10/2000 | Jamzadeh et al. |
| 9,470,175 B2 | 10/2016 | Pascoli et al. |
| 2008/0110283 A1 | 5/2008 | Shaver et al. |

FOREIGN PATENT DOCUMENTS

| | | |
|---|---|---|
| DE | 41 27 576 A1 | 3/1993 |
| DE | 199 54 539 A1 | 5/2001 |
| DE | 10 2007 006 666 A1 | 11/2007 |
| DE | 10 2015 223 725 A1 | 6/2017 |
| DE | 10 2017 221 876 A1 | 6/2019 |
| GB | 2134265 A | 8/1984 |
| GB | 2259148 A | 3/1993 |
| WO | WO 2019 110228 A1 | 6/2019 |

OTHER PUBLICATIONS

International Preliminary Report in PCT/EP2018/080423 dated Mar. 9, 2020 in German (18 pages).

\* cited by examiner

GRADIENT DETERMINATION FOR MEASURING ROTATIONAL SPEEDS

CROSS-REFERENCE TO RELATED APPLICATIONS

This application is a U.S. national stage application under 35 U.S.C. § 371 of PCT Application No. PCT/EP2018/080423, filed on Nov. 7, 2018, and published as WO 2019/110228 A1 on Jun. 13, 2019, which claims priority from German Application No. DE 10 2017 221 876.2, filed on Dec. 5, 2017, the entirety of which are each hereby fully incorporated by reference herein.

The invention relates to an assembly according to the preamble of claim 1 and a method according to the preamble of claim 4.

Derivations from measurements are used in numerous applications. Either simple difference quotients or digital filters (e.g. Savitzki-Golay filters) are used for this. A DT1 element can be used as a simple control theory element. It is common to all derivatives that noise in the fundamental signal results in substantial noise in the derivative. If the derivative is filtered—e.g. by a digital filter with a wide window, or a DT1 element with a high time constant, there is a phase shift between the input signal and the derivative of this signal.

A typical method for determining rotational rates is based on the fact that contours of a rotating transmitter wheel are recorded and subsequently evaluated. For this, it is possible to determine how many teeth pass by the sensor in a time interval by means of a dead time measurement. The temporal spacing between the last two teeth passing by the sensor is determined.

The frequencies that can be implemented for sampling the sensor signals constantly increase due to the technological improvements. Higher sampling frequencies are accompanied by higher requirements as well as improved opportunities for more precisely determining rotational rate gradients. In many previous software applications, rotational rates are recorded in 10 ms intervals. If the intervals are shortened to approx. 1 ms, only one tenth of the markings on the transmitter wheel pass by the sensor at a constant rotational rate for each sampling interval. Depending on the rotational rate and the number of markings on the transmitter wheel, there are significantly more time intervals in which no teeth pass by the transmitter wheel, i.e. no new rotational rate information is obtained. With an ongoing calculation of the rotational rate gradients, it must still be possible to form a signal at times when no new rotational rate information is available.

The fundamental object of the invention is to eliminate the disadvantages associated with the solutions known from the prior art. In particular, a rotational rate gradient should be obtained with as little phase shift as possible and low signal noise. With rotations starting from a standstill and approaching a standstill, the rotational rate gradient should be obtained as precisely as possible.

This object is achieved by an assembly according to claim 1 and a method according to claim 4. Preferred developments are described in the dependent claims.

The assembly comprises a rotating element, a sensor, and an evaluation unit. The element is loose and unrestricted, and should be able to rotate over an arbitrary angle, in particular over an angle of more than 360°.

The element has one or more markings. The number of markings equals a. The element can be a transmitter wheel which is connected to a shaft or an axle for conjoint rotation. A dial can be used for the transmitter wheel, which has holes at its circumference. The holes are separated by a web between each adjacent pair. A gearwheel can also be used for the transmitter wheel, the teeth of which are then also used as the markings.

An inductive sensor, a magnetic field sensor, or an optoelectronic sensor can be used.

The sensor, or a region detected by the sensor is oriented toward the markings. When the element rotates, the markings pass through the detected region in cycles. This means that each marking passes through the region detected by the sensor precisely once when the element rotates 360°.

The markings pass through the region detected by the sensor in that at least part of a marking enters the region, passes through the region, and exits the region. When a marking passes by, the sensor generates a signal. The signal can be generated when at least part of the marking enters the region or exits the region, or when it is located in the region.

The signal is sent to the evaluation unit. This is configured to assign a time $t_i$ to each signal when it is sent, where $i \in \{0, 1, \ldots\}$ and $t_i < t_{i+1}$ for all $i \in \{0, 1, \ldots\}$, and to calculate a function n(t) over time t as the measure for a rotational rate of the element, where $$n(t_i) = \frac{1}{a * (t_i - t_{i-1})}$$

for all $i \in \{1, 2, \ldots\}$.

The times $t_i$ at which signals are sent correspond to times in which a marking passes through the region detected by the sensor.

According to the invention, the evaluation unit is also configured to calculate a function m(t) over time t as the measure for a gradient or change in the rotational rate of the element, where $$m(t_j) = \frac{n(t_j) - n(t_k)}{t_j - t_k}$$

for at least one, preferably all, $j \in \{1, 2, \ldots\}$. In doing so, $k \in \{0, 1, \ldots\}$ is selected such that the following applies: $t_k \leq t_j - T < t_{k+1}$, where T is a constant.

According to the invention, only those rotational rates that have been determined at times in which a marking passes through the region detected by the sensor are used to determine the rotational rate gradients. There is a time interval of at least T between the times.

In many applications, the deceleration of the rotating element to a standstill and the movement starting from the standstill are of particular interest. Using the method according to the invention, gradient values are obtained in realtime when the rotation starts from a standstill.

In particular, the signal is clearly improved when the rotational rate is slower, because the spacing between the points in time used for obtaining the gradients is greater. The gradient is then obtained based on less sensor information, in order to determine the most current value for the gradients. With very low rotational rates, the gradient is obtained from the last two sensor signals.

The method according to the invention is distinguished in that the gradient at higher rotational rates—thus when sensor signals are available in sufficiently short time intervals—is not obtained via adjacent samplings, but instead via the parameterized time constant T, which covers numerous passages of a marking through the region detected by the sensor. The noise portion of the sensor signal that is involved in obtaining the gradient is thus reduced.

Instead of determining the rotational rate gradient according to the invention as a difference quotient, it is conceivable to use a digital filter with a variable window width. This corresponds to a variable number of measurement values. As a result, not only the first and last values of the time interval in question, but numerous values, are used for determining the gradient.

Normally, a lowest rotational rate $n_{min}$ that is to be detected is defined. If no marking passes through the region detected by the sensor in a time interval derived therefrom, it is assumed that the element is at a standstill. In this case, the theoretically determined rotational rate is then stored for the gradient determination. A value of 0 is output as the gradient.

If the rotating element starts to rotate again after remaining stationary for a longer period of time, a marking enters the region detected by the sensor as a result of the rotation. Because of this standstill, the temporal spacing between the detection of this marking and the last marking that passed through the region detected by the sensor is quite long. This would correspond to a rotational rate that lies below the minimum rotational rate $n_{min}$. Accordingly, the evaluation unit would calculate the rotational rate as being equal to 0. The rotational rate gradient would likewise be 0.

If the next marking passes through the region detected by the sensor, it can be expected that the average rotational rate calculated on the basis of the two last detected markings exceeds the minimum rotational rate $n_{min}$. If the rotational rate gradient is then obtained as a difference quotient, the value would be too high. In order to avoid this, the evaluation unit is preferably configured to calculate $$m(t_{j'}) = \frac{n(t_{j'}) - n_{min}}{t_{j'} - t_k}$$

for at least one $j' \in \{1, 2, \ldots\}$, when $n(t_{k'}) < n_{min}$. In this case, $k' \in \{0, 1, \ldots\}$ is selected such that: $t_{k'} \leq t_{j'} - T < t_{k'+1}$.

If the detected rotational rate is less than the minimum rotational rate $n_{min}$, instead of actual recorded rotational rate, the minimum rotational rate $n_{min}$ is used for calculating the gradient. The curve of the rotational rate gradients is thus smaller and reflects the actual curve of the rotational rates more accurately.

The gaps between the times $t_i$, where $i \in \{0, 1, \ldots\}$, are interpolated in a preferred development. According to this development:

$$m(t') = m(t_j)$$

for at least one time $t'$ when $t_j < t' < t_{j+1}$, preferably for all times $t'$ when $t_j < t' < t_{j+1}$.

The method according to the invention is the method described above, implemented by the evaluation unit in the assembly according to the invention, or a preferred development thereof.

Preferred exemplary embodiments are shown in the figures. Identical reference symbols indicate identical or functionally identical features. In detail:

In FIGS. 1 to 5, the curve of a rotational rate function n(t) and a rotational rate gradient m(t) is shown in relation to time t. A hypothetical curve of the rotational rate n(t), that would correspond to the calculated gradient m(t) is indicated by dotted lines.

A rotating transmitter wheel is sampled by means of a sensor. The sampling takes place at discrete successive times in a temporal spacing—a sampling interval—of $t_s$. The times $t_i$, where $i \in \{0, 1, \ldots\}$, at which a marking on the transmitter wheel is detected by the sensor, are whole number multiples of the sampling interval $t_s$.

The rotational rate function n(t) is calculated in the FIGS. 1 to 4 as follows:

$$n(t_i) = \frac{1}{a * (t_i - t_{i-1})}$$

for all $i \in \{1, 2, \ldots\}$.

Figure 1:
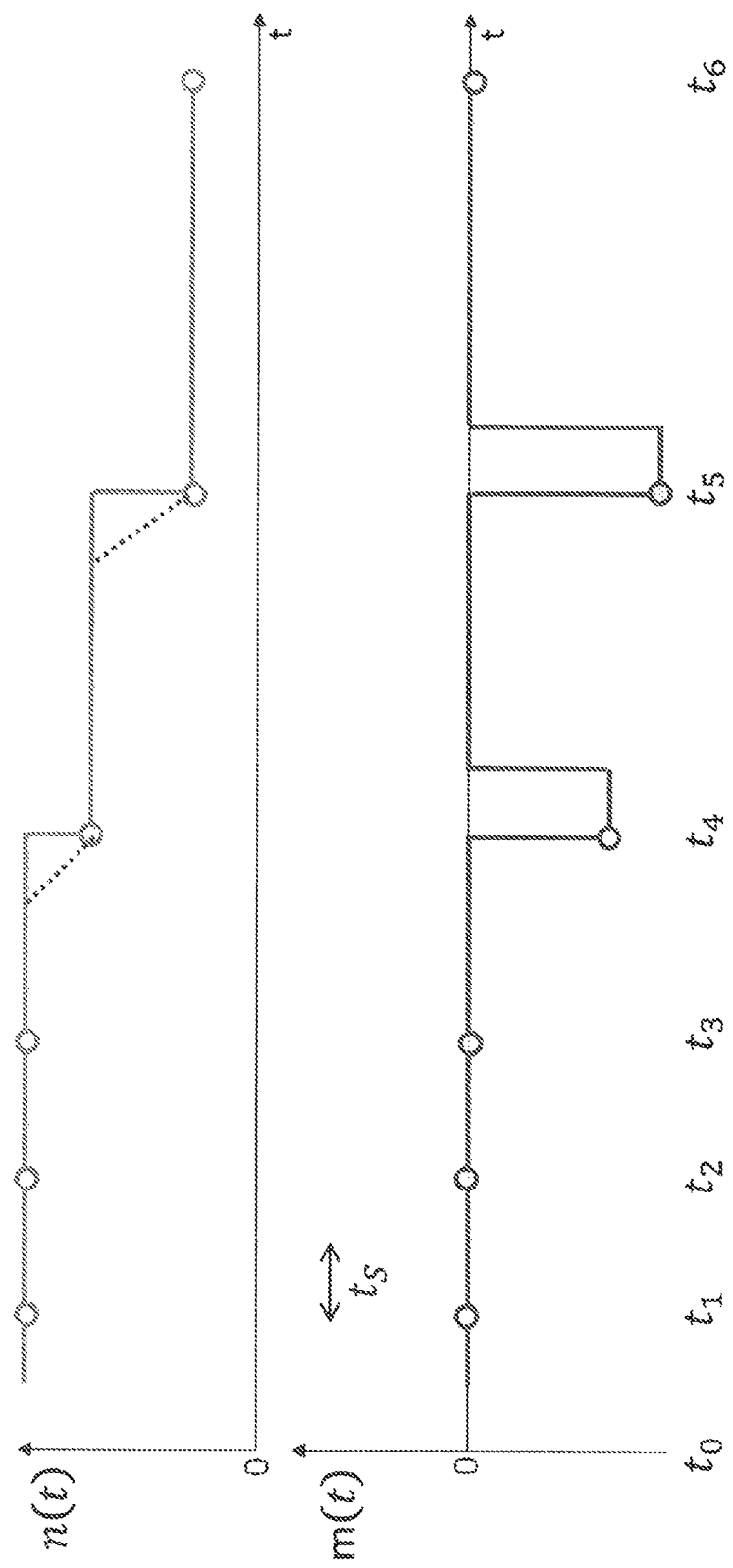
FIG. 1 shows a first method for determining gradients from the prior art.

The rotational rate gradient m(t) is $m(t) = n(t) - n(t-t_s)/t_s$ according to FIG. 1.

Regardless of whether the curve of the rotational rate is continuous or not, the gradient m(t) at $t_3$ and $t_4$ has pulse-like peaks. This can be prevented in that the gradient m(t) is obtained as a difference quotient via the last two available rotational rate data, as follows:

$$m(t_i) = \frac{n(t_i) - n(t_{i-1})}{t_i - t_{i-1}}$$

where $i \in \{1, 2, \ldots\}$.

Figure 2:
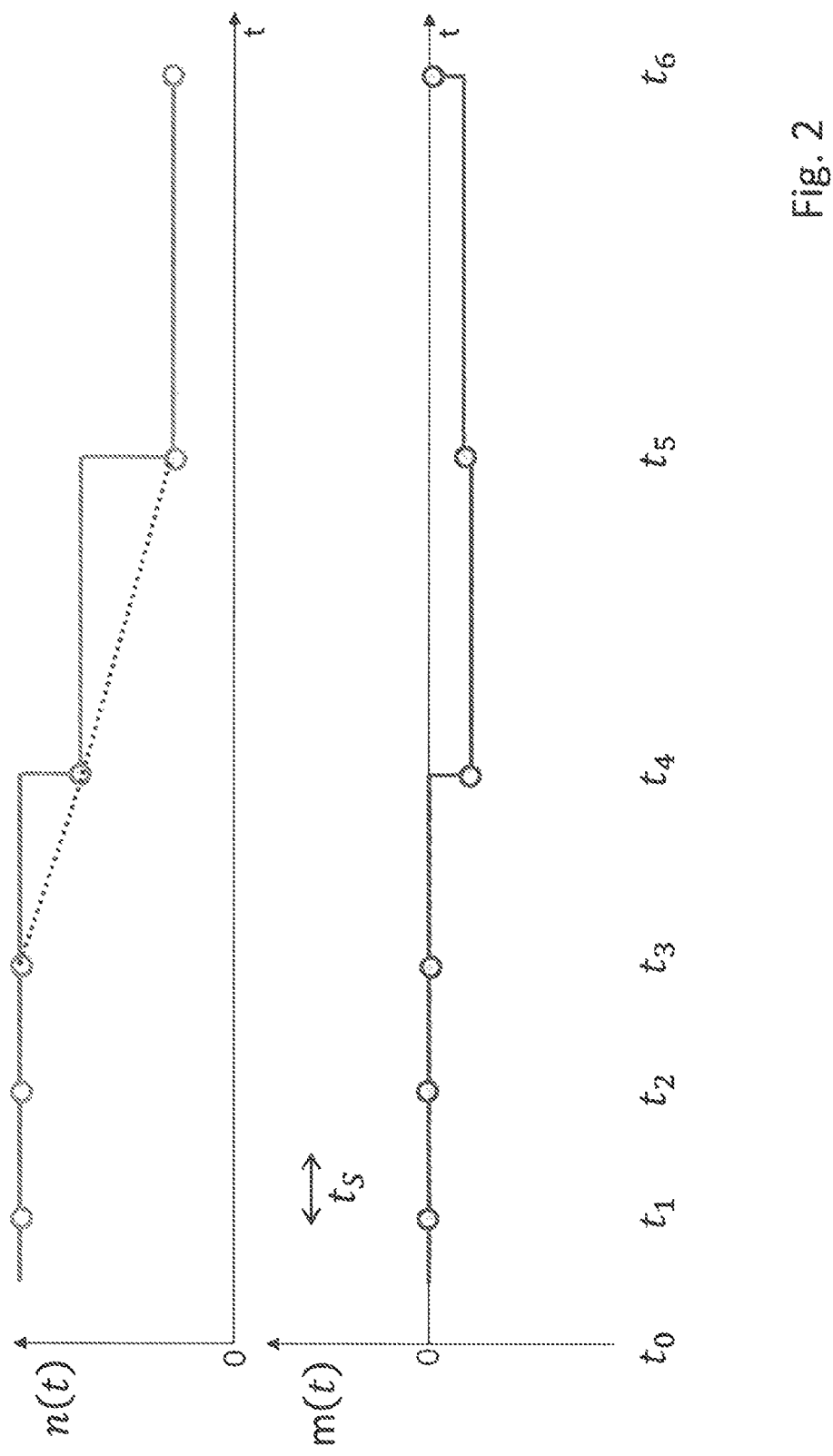
FIG. 2 shows a second method for determining gradients from the prior art.
Figure 3:
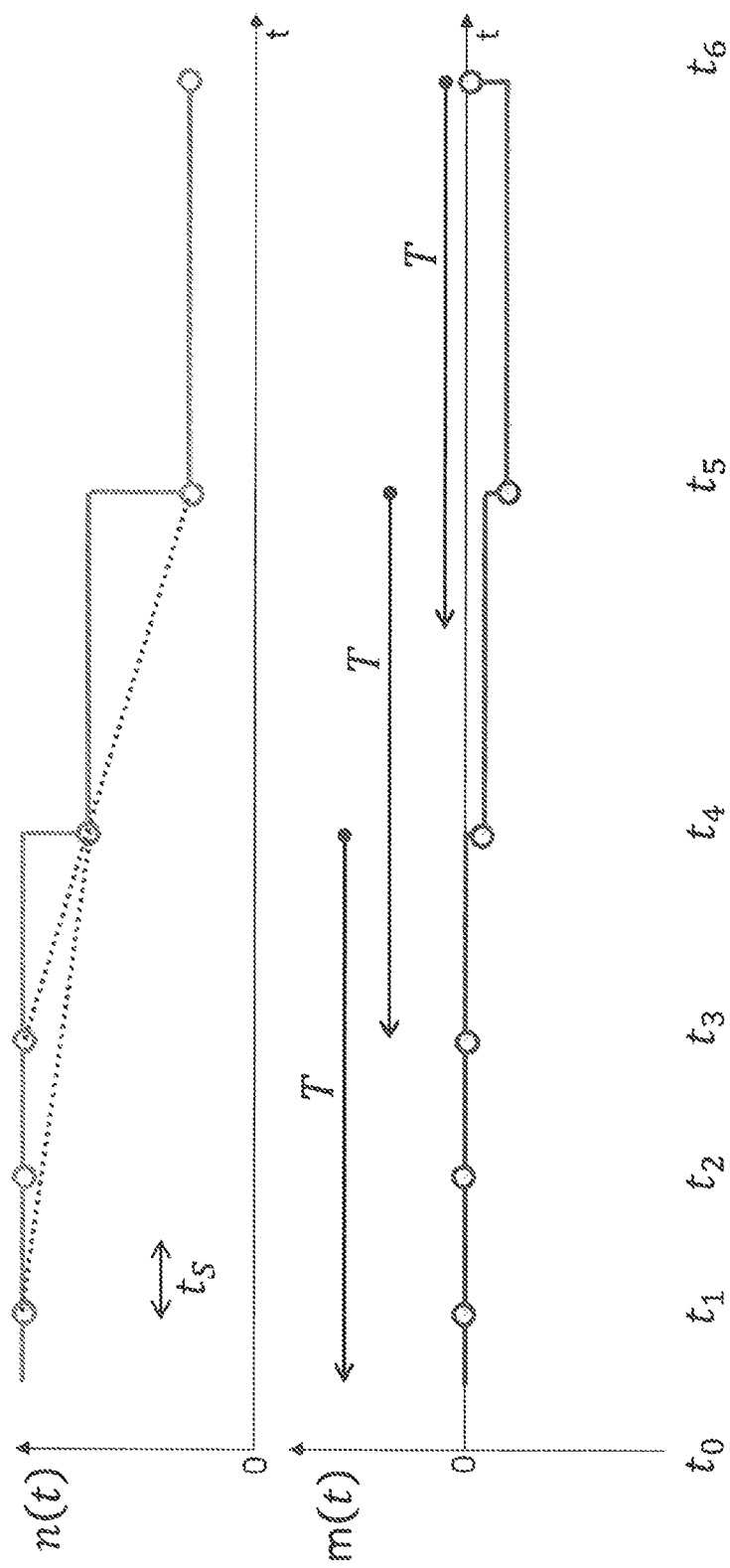
FIG. 3 shows a method for determining gradients with a time constant.

The gradient m(t) shown in FIG. 2 is still subject to noise and has been subjected to a phase shift, which is dependent on the rotational rate, despite its smoothed curve. This problem can be solved in that the gradient m(t), as shown in FIG. 3, is obtained via a time constant T that can be parameterized. The gradient m(t) is calculated here for $j \in \{1, 2, \ldots\}$ as $$m(t_j) = \frac{n(t_j) - n(t_k)}{t_j - t_k}$$

wherein $k \in \{0, 1, \ldots\}$ is selected such that: $t_k \leq t_j - T < t_{k+1}$, when T is a constant.

Figure 4:
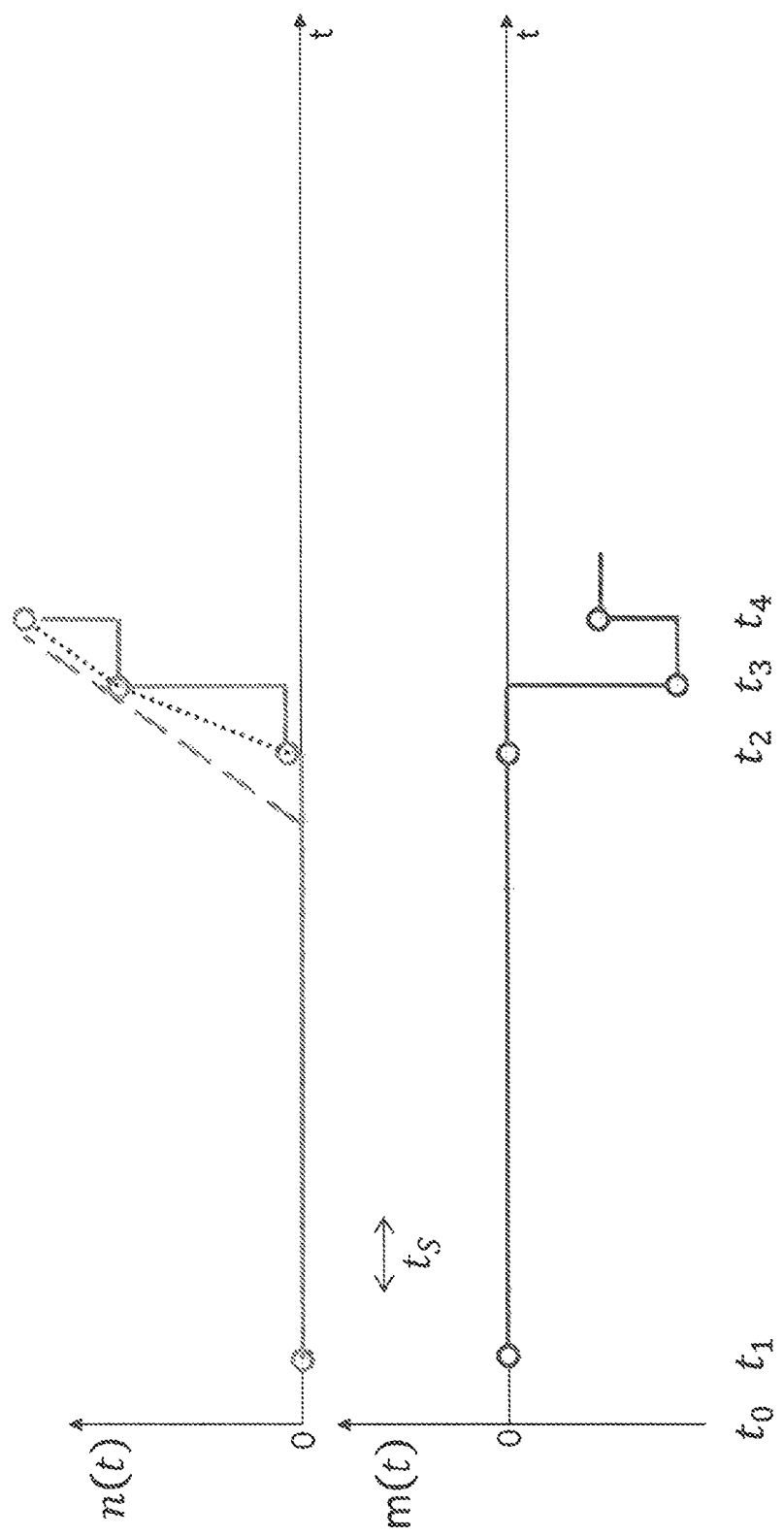
FIG. 4 shows a rotation starting from a standstill.

FIG. 4 shows a curve of the rotational rate function n(t) with a transmitter wheel that starts to rotate from a standstill. The broken line shows the actual curve of the rotational rate. Because of the long standstill between the times $t_1$ and $t_2$, a rotational rate is calculated at time $t_3$ that is much lower than the actual rotational rate. This results in a peak formed in the gradient m(t) in the region $t_3 \leq t < t_4$.

Figure 5:
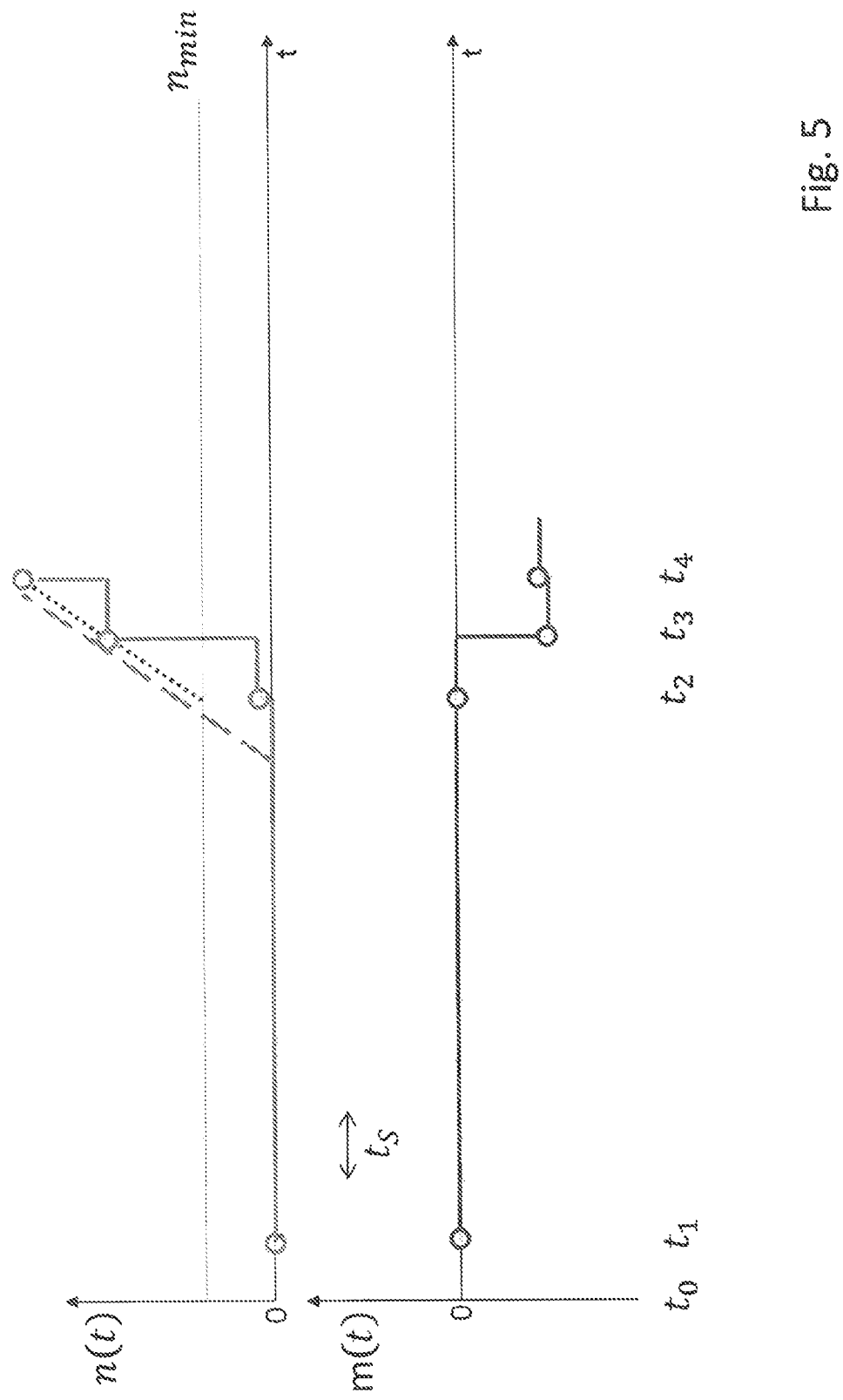
FIG. 5 shows an improved method.

Such peaks can be eliminated, as shown in FIG. 5, by providing a minimum rotational rate $n_{min}$. If the rotational rate n(t) calculated from the sensor signals at a time t is lower than the minimum rotational rate $n_{min}$, then the minimum rotational rate $n_{min}$ is used to determine the gradients, instead of the calculated rotational rate n(t). For $t_3 \leq t < t_4$, m(t) is therefore calculated as $$m(t) = \frac{n(t_3) - n_{min}}{t_3 - t_2}.$$

In this case, T is parameterized as $t_s$ for purposes of simplicity.

The invention claimed is:

1. An assembly comprising:
   a rotating element;
   a sensor; and
   an evaluation unit;
   wherein the element has a number a of markings;
   wherein the markings pass through a region detected by the sensor in cycles when the element rotates;
   wherein the sensor is configured to send a signal to the evaluation unit; and
   wherein the evaluation unit is configured to:
   assign a time $t_i$ to when each signal is sent, where $i \in \{0, 1, \ldots\}$ and $t_i < t_{i+1}$ for all $i \in \{0, 1, \ldots\}$, and
   calculate a function n(t) over time t as a measure for a rotational rate of the element, where $$n(t_i) = \frac{1}{a * (t_i - t_{i-1})}$$

for all $i \in \{1, 2, \ldots\}$;
   calculate a function m(t) over time t as a measure for a gradient of the rotational rate of the element, where $$m(t_j) = \frac{n(t_j) - n(t_k)}{t_j - t_k}$$

for at least one $j \in \{1, 2, \ldots\}$, wherein $k \in \{0, 1, \ldots\}$ is selected such that: $t_k \leq t_j - T < t_{k+1}$, when T is a constant.

2. The assembly according to claim 1, wherein $$m(t_{j'}) = \frac{n(t_{j'}) - n_{min}}{t_{j'} - t_k}$$

for at least one $j' \in \{1, 2, \ldots\}$; and
   wherein $n(t_{k'}) < n_{min}$, and $k' \in \{0, 1, \ldots\}$ is selected such that: $t_{k'} \leq t_{j'} - T < t_{k'+1}$.

3. The assembly according to claim 1, wherein
   $m(t') = m(t_j)$
   for at least one time t', where $t_j < t' < t_{j+1}$.

4. A method of measuring a rotational rate of a rotating element, the method comprising:
   monitoring, by a sensor, markings on the rotating element that pass through a region monitored by the sensor in cycles when the rotating element rotates, wherein the element has a number a markings;
   sending, by the sensor, signals to the evaluation unit, wherein each signal is assigned a time $t_i$ for when it was sent, where $i \in \{0, 1, \ldots\}$ and $t_i < t_{i+1}$ for all $i \in \{0, 1, \ldots\}$;
   calculating, by the evaluation unit, a function n(t) over time t as a measure for a rotational rate of the element, where $$n(t_i) = \frac{1}{a * (t_i - t_{i-1})}$$

for all $i \in \{1, 2, \ldots\}$; and
   calculating a function m(t) over time t as a measure for a gradient of the rotational rate of the element, where $$m(t_j) = \frac{n(t_j) - n(t_k)}{t_j - t_k}$$

for at least one $j \in \{1, 2, \ldots\}$, wherein $k \in \{0, 1, \ldots\}$ is selected such that: $t_k < t_j - T < t_{k+1}$, when T is a constant.

* * * * *